(No Model.)
A. VREELAND.
SAW FILE HOLDER AND GUIDE.
No. 593,793. Patented Nov. 16, 1897.
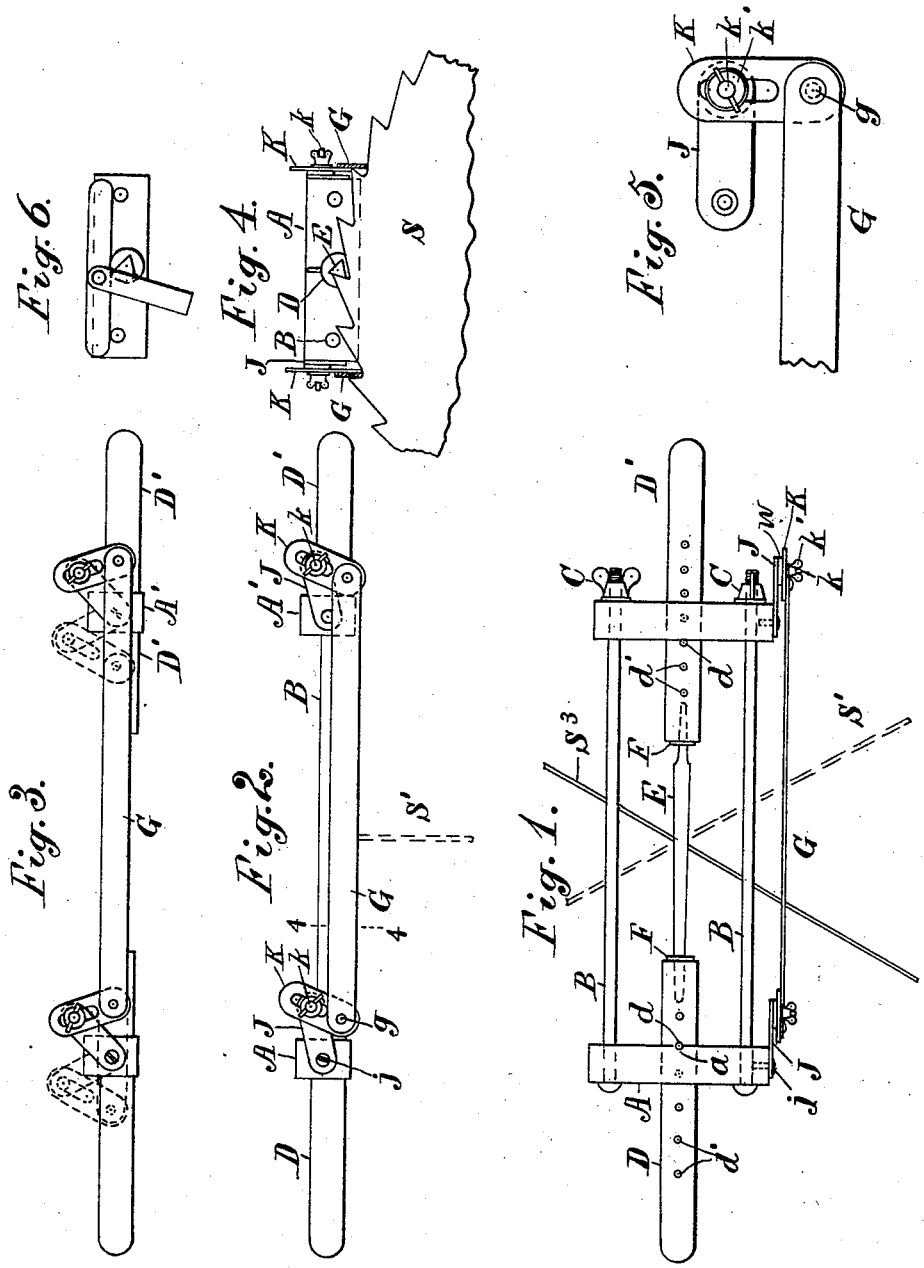
Attest:
L. Lee.
Edw. P. Kinsey.
Inventor.
Aaron Vreeland, per
Thomas S. Crane, Atty.

UNITED STATES PATENT OFFICE.

AARON VREELAND, OF EAST ORANGE, NEW JERSEY.

SAW-FILE HOLDER AND GUIDE.

SPECIFICATION forming part of Letters Patent No. 593,793, dated November 16, 1897.

Application filed June 2, 1897. Serial No. 639,097. (No model.)

*To all whom it may concern:*

Be it known that I, AARON VREELAND, a citizen of the United States, residing at East Orange, county of Essex, State of New Jersey, have invented certain new and useful Improvements in Saw-File Holders and Guides, fully described and represented in the following specification and the accompanying drawings, forming a part of the same.

The object of the present invention is to furnish, in connection with the saw-file, a guide adapted to contact with the saw-teeth if the file be twisted or rocked improperly when moving across the blade of the saw; and the invention consists, primarily, of a frame formed of cross-bars connected by adjustable tie-rods and provided with adjustable handles of special construction to embrace the shank and point of the file. The tie-rods may serve as a guide to contact with the teeth in certain cases, but such guide is not adjustable, and to furnish a guide adapted to all cases I provide a guide connected adjustably with the ends of the cross-bars to contact with the saw-teeth upon both straight and circular saws, and thus prevent the operator from unduly twisting the file when sharpening the teeth. The tie-rods are connected to one of the cross-bars by thumb-nuts applied to the outer side of the same to clamp the handles upon the shank and point of the file; but to adjust the handles quickly with files of different lengths I form one or both of the handles with a series of transverse holes and fit a pin through one of such holes to rest against the inner side of the cross-bar. The pin upon the handle which receives the tang of the file is preferably fitted to a notch in the adjacent cross-bar to hold the handle from turning, but the pin in the handle which fits the point of the file is rotatable to adjust the file, and after such adjustment the file and handle are held from turning by tightening the nuts upon the tie-rods to induce frictional pressure of the cross-bar upon such pins.

These improvements will be understood by reference to the annexed drawings, in which—

Figure 1 is a plan of the device with dotted lines representing the edge of a saw-blade. Fig. 2 is an edge view of the device with the adjustable guide arranged for filing a circular saw. Fig. 3 is a similar view with the guide arranged to file a straight saw. Fig. 4 is a cross-section on line 4 4 in Fig. 2 with a segment of a circular saw. Fig. 5 is an enlarged view of one end of the guide-bar and fixtures for attaching it to the cross-bar, and Fig. 6 is a diagram showing the tie-rods and file in section with an adjustable bevel for setting the file at the desired angle.

A A' designate the cross-bars, and B the tie-rods, having tightening-nuts C at one end. The cross-bars are shown perforated to admit the handles D D', which support, respectively, the tang and point of the file E. The handles are arranged upon the same axial line, near the lower side of the cross-bars, as shown in Fig. 6, and are fitted movably through the holes in the cross-bars and provided each with a cross-pin $d$ to rest upon the inner side of the cross-bar. Each handle is shown with a series of holes $d'$, in which the cross-pin may be inserted, and the pin upon the handle D is shown fitted to a notch $a$ in the cross-bar A to hold such handle from rotating. The handles are furnished upon their adjacent ends with sockets, in which the tang and point of the file E can be turned when setting the file to the angle of the saw-tooth, and the tang and point of the file are preferably furnished each with a washer F to bear upon the ends of the handles to increase the frictional resistance to the displacement of the file when clamped in the frame. The file is set at the desired angle in the frame by means of the bevel or gage shown in Fig. 6 and having a stock to rest upon the tie-rods and a blade pivoted adjustably thereto by a tightening-screw, as is common in bevel-gages. With such a frame the pins $d$ are adjusted in the holes $d'$ in the handles to admit a file of the desired length. The working face of the file is then set at the desired angle by means of the bevel H I, and the nuts C are then tightened upon the tie-rods, which clamp the file and handles firmly and prevent them from displacement. Washers F are selected which will jam upon the tapering point and tang of the file, and they thus support the thrust of the handles and prevent the tang and point from crowding into the sockets of the handles and wearing out the same.

It will be understood that the handles D and D' are wholly removable and that handles with different-sized sockets may be used for supporting files of different sizes and shapes, as may be required. If the teeth of the saw are of suitable depth to bring one or both of the tie-rods in contact with the teeth when filing one of the same, such tie-rod serves as a guide to prevent the operator from improperly holding or twisting the file; but where an adjustable guide is needed an auxiliary guide-bar G is connected with the ends of the cross-bars A A' by means of links which permit its adjustment at any required plane below the tie-rods. Two links are preferably attached to each end of the guide-bar G, the links J being pivoted to the ends of the cross-bars A A' and the links K, which are jointed upon the ends of the guide-bar, being slotted and clamped upon the ends of the links J by clamp-bolts $k$. When such clamp-bolts are tightened, both links are held rigidly, and the guide-bar G is thus held in its adjusted position. In filing a handsaw which has a straight edge and rather fine teeth a guide-bar at one edge of the frame only is required, as shown in Fig. 1, the file being supported in the notch between the teeth and held at the desired angle in such notch by the contact of the guide-bar with the edge of the saw. In filing a circular saw, especially one with large teeth which are sharpened only upon the points, two such guide-bars may be used to hold the file from the bottom of the notch, and in such case the guides would be attached to opposite ends of each cross-bar by similar links, as shown in Fig. 4, the lower edges of the guide-bars being adjusted to slide in contact with the periphery of the saw S when the file is properly adjusted in contact with one tooth. Such adjustment of the guides is effected in either case with the frame in a proper position upon the saw, whether transverse to the frame, as indicated by the dotted lines S' in Fig. 2, or obliquely, as indicated by the dotted lines $S^3$ in Fig. 1. The two links at each end of the guide-bar G permit the guide-bar to be moved forwardly or backwardly in relation to the file, so as to rest upon the edge of the saw when the file is held obliquely thereto. Thus in Fig. 1 the saw-blade $S^3$ is shown inclined to the forward end of the frame (which holds the point of the file) at the lower side of the figure, and the guide-bar is accordingly adjusted toward the forward end of the frame, as indicated in the full lines in Figs. 1 and 3, while an adjustment toward the rear end of the frame is represented in dotted lines in Fig. 3, as would be required when the frame is applied in a reverse direction to the saw-blade, as indicated by the dotted lines $S^3$ in Fig. 1. These adjustments of the guide-bar G are effected by making the link K to move over the link J in any adjusted position, and this is accomplished by pivoting the link J upon the end of the cross-bar by a screw having countersunk head $j$ and inserting a washer or space-ring $w$ between the links J and K where the clamping-bolt $k$ is inserted through the same. The guide-bar is joined to the links K by rivets $g$, which permit the links to turn upon the bar; but all these joints are held immovably when the links J and K are clamped together by the nuts $k'$, which are shown upon the bolts $k$.

Having thus set forth the nature of my invention, what I claim herein is—

1. A saw-file holder and guide comprising the cross-bars A, A', provided with the rods B and tightening-nuts C, the handles D, D' fitted to the tang and point of the file, and inserted removably in the cross-bars as set forth, pins $d$ inserted through the handles upon the inner side of the cross-bars to press the handles upon the ends of the file when the nuts are tightened, and the notch $a$ in the cross-bar A, to hold the handle D from rotating, as and for the purpose set forth.

2. A saw-file holder and guide comprising the cross-bars A, A', provided with the rods B and tightening-nuts C, the handles D, D' fitted to the tang and point of the file, and inserted removably in the cross-bars as set forth, pins $d$ inserted through the handles upon the inner side of the cross-bars to press the handles upon the ends of the file when the nuts are tightened, and the handle D' having a series of holes $d^2$ to receive the pin $d$, as and for the purpose set forth.

3. A saw-file holder and guide comprising the cross-bars A, A', provided with tie-rods B and tightening-nuts C, handles supported in the cross-bars to fit the tang and point of the file, and the guide-bar G linked to the corresponding ends of the cross-bars and adjustable below the plane of the tie-rods, as and for the purpose set forth.

4. A saw-file holder and guide comprising the cross-bars A, A', provided with tie-rods B and tightening-nuts C, handles supported in the cross-bars to fit the tang and point of the file, and the guide-bar G connected at each end with the end of one of the cross-bars by jointed links having a clamping-bolt at their intersection, as and for the purpose set forth.

5. A saw-file holder and guide comprising the cross-bars A, A', provided with tie-rods B and tightening-nuts C, handles supported in the cross-bars to fit the tang and point of the file, and the guide-bar G provided at each end with the slotted link K having the link J secured thereto by the clamping-bolt $k$ fitted to the slot, the links K being pivoted upon the ends of the cross-bars, as and for the purpose set forth.

In testimony whereof I have hereunto set my hand in the presence of two subscribing witnesses.

AARON VREELAND.

Witnesses:
THOMAS S. CRANE,
EDWARD F. KINSEY.